(12) United States Patent
Schäfer et al.

(10) Patent No.: US 10,800,886 B2
(45) Date of Patent: Oct. 13, 2020

(54) PROCESS FOR PREPARING OXAMIDE-FUNCTIONAL SILOXANES

(71) Applicant: WACKER CHEMIE AG, Munich (DE)

(72) Inventors: Oliver Schäfer, Burghausen (DE); Petra Gratzl, Tüßling (DE)

(73) Assignee: WACKER CHEMIE AG, Munich (DE)

( * ) Notice: Subject to any disclaimer, the term of this patent is extended or adjusted under 35 U.S.C. 154(b) by 133 days.

(21) Appl. No.: 16/307,767

(22) PCT Filed: Apr. 7, 2017

(86) PCT No.: PCT/EP2017/058414
§ 371 (c)(1),
(2) Date: Dec. 6, 2018

(87) PCT Pub. No.: WO2018/184695
PCT Pub. Date: Oct. 11, 2018

(65) Prior Publication Data
US 2019/0315927 A1   Oct. 17, 2019

(51) Int. Cl.
*C08G 77/08* (2006.01)
*C08G 77/26* (2006.01)
*B01J 31/02* (2006.01)

(52) U.S. Cl.
CPC .......... *C08G 77/26* (2013.01); *B01J 31/0265* (2013.01); *C08G 77/08* (2013.01)

(58) Field of Classification Search
None
See application file for complete search history.

(56) References Cited

U.S. PATENT DOCUMENTS

| | | | |
|---|---|---|---|
| 2007/0149745 A1 | 6/2007 | Leir et al. | |
| 2008/0318057 A1* | 12/2008 | Sherman | C08G 77/455 428/423.1 |
| 2011/0071268 A1* | 3/2011 | Hays | C08G 77/455 528/26 |
| 2011/0126968 A1* | 6/2011 | Determan | C09J 7/38 156/229 |
| 2012/0264890 A1* | 10/2012 | Hansen | C08G 77/388 525/474 |
| 2013/0011673 A1* | 1/2013 | Hansen | C08G 65/007 428/355 R |
| 2013/0012667 A1* | 1/2013 | Hansen | C08G 65/007 525/477 |
| 2016/0002514 A1* | 1/2016 | Determan | B32B 7/12 428/220 |
| 2017/0073550 A1* | 3/2017 | Barrios | C09J 7/38 |
| 2017/0362391 A1* | 12/2017 | Yang | C09D 183/08 |

FOREIGN PATENT DOCUMENTS

| | | |
|---|---|---|
| EP | 1963404 B1 | 4/2011 |
| WO | 10077477 A1 | 7/2010 |
| WO | 11090644 A2 | 7/2011 |

OTHER PUBLICATIONS

Buckwalter et al. "Synthesis and characterization of siloxane-containing poly(urea oxamide) segmented copolymers" Polymer, 54, 2013, 4849-4857. (Year: 2013).*
Buckwalter et al. "Effects of Copolymer Structure on the Mechanical Properties of Poly(dimethylsiloxane) Poly(oxamide) Segmented Copolymers" Macromol. Chem. Phys. 2013, 214, 2073-2082. (Year: 2013).*

* cited by examiner

*Primary Examiner* — Robert S Loewe
(74) *Attorney, Agent, or Firm* — Brooks Kushman P.C.

(57) ABSTRACT

The invention relates to a process for producing oxamide-functional siloxanes by reacting
(A) siloxanes of the general formula (I)

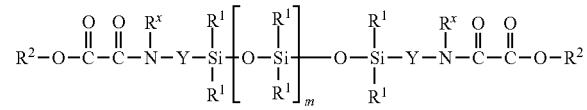

with
(B) siloxanes selected from
(B1) linear siloxanes of the general formula
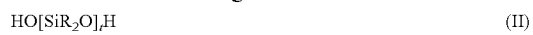
$$\text{HO[SiR}_2\text{O]}_x\text{H} \qquad (II)$$
and
(B2) cyclic compounds of the general formula
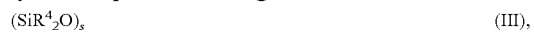
$$(\text{SiR}^4{}_2\text{O})_s \qquad (III),$$
wherein the radicals and indices have the definitions specified in claim 1,
in the presence of
(C) catalysts.

9 Claims, No Drawings

PROCESS FOR PREPARING OXAMIDE-FUNCTIONAL SILOXANES

CROSS-REFERENCE TO RELATED APPLICATIONS

This application is a U.S. National Phase Application of PCT/EP2017/058414, filed Apr. 7, 2017, the contents of which are incorporated herein by reference in their entireties for all purposes.

FIELD OF THE INVENTION

The invention relates to a process for producing oxamide-functional siloxanes.

BACKGROUND OF THE INVENTION

Oxamide-functional polysiloxanes can be used in many fields of application, but especially for producing block copolymers of thermoplastic siloxanes such as are described, for example, in EP-A 1 963 404. The production of such oxamide-functional siloxanes is known in principle and described in US-A 2007/0149745. Bisaminoalkyl-functional siloxanes are used as starting products in this case which can be prepared by various methods. These bisamino-alkyl-functional siloxanes are preferably reacted with dialkyl oxalates, present in excess, to give the desired substituted amino-oxo-acetate-functional siloxanes, referred to below simply as oxamide-functional siloxanes. For further conversion of these products, the excess of dialkyl oxalates present in the reaction mixture generally also have to be removed, which is accomplished here particularly by vacuum distillation. There are some things which are disadvantageous in the method described. For instance, the degree of functionalization of the oxamide-functional siloxanes primarily depends on the degree of functionalization of the bisaminoalkylsiloxanes used as starting material, which can, however, only be produced with a functionality >99% with considerable effort. Furthermore, in order to avoid secondary reactions, it is necessary to use the added dialkyl oxalates in relatively large excesses, which leads in turn, to a complex and expensive removal of the proportions of unreached dialkyl oxalate, since this is somewhat toxic. A third essential disadvantage is the fact that commercially available dialkyl oxalates, such as diethyl oxalate for example, also contain impurities which, in the reaction with bisamino-functional siloxanes, result in some very strongly colored products which have to be laboriously decolorized in a further step when the further use requires optically clear and colorless products. A further disadvantage consists in that, in the production of high molecular weight oxamide-functional siloxanes, the aminosilicone precursors of a correspondingly high molecular weight have to be used, the high viscosity of which, especially when filling the reactors, leads to long filling and therefore long downtimes, which unnecessarily increases the cost of production of these products. To produce oxamide-functional siloxanes of different chain lengths, the availability of corresponding aminosiloxane precursors is likewise obligatory.

A simple route has therefore been sought to obtain oxamide-functional polydimethylsiloxanes of high purity with a high-degree of functionalization in a process that is as simple and rapid as possible.

SUMMARY OF THE INVENTION

Surprisingly, it has now been found that, despite the presence of chemically reactive groups such as amide and ester groups, the desired oxamide-functional polydimethylsiloxanes could be produced by an acid- or base-catalyzed equilibration reaction, in which only the smallest amounts of catalysts are sufficient to catalyze the equilibration reaction.

DETAILED DESCRIPTION OF PREFERRED EMBODIMENTS

The invention provides a process for producing amino-oxo-acetate-functional organosiloxanes by reacting
(A) siloxanes of the general formula (I)

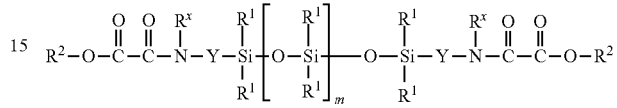

with
(B) siloxanes selected from
(B1) linear siloxanes of the general formula $$HO[SiR_2O]_tH \qquad (II)$$

and
(B2) cyclic compounds of the general formula $$(SiR^4{}_2O)_s \qquad (III),$$

where
R may be the same or different and denotes a hydrogen atom or monovalent, optionally substituted, SiC-bonded hydrocarbon radicals, which may be interrupted by heteroatoms, preferably an oxygen atom,
$R^1$ may be the same or different and denotes monovalent, optionally substituted, SiC-bonded hydrocarbon radicals, which may be interrupted by heteroatoms, preferably an oxygen atom,
Y may be the same or different and represents divalent, optionally substituted hydrocarbon radicals, which may be interrupted by oxygen atoms,
$R^2$ may be the same or different and denotes a hydrogen atom, monovalent, optionally substituted hydrocarbon radicals, which may be interrupted by oxygen atoms,
$R^4$ may be the same or different and denotes a hydrogen atom, Si-bonded halogen atom, Si-bonded hydroxyl group or monovalent, optionally substituted, SiC-bonded hydrocarbon radicals, which may be interrupted by heteroatoms, preferably an oxygen atom,
$R^x$ may be the same or different and signifies a hydrogen atom or optionally substituted hydrocarbon radicals,
m is 0 or an integer, preferably 0 or an integer from 1 to 10, particularly preferably 0,
s is an integer from 3 to 10, preferably 4 or 5, and
t signifies an integer greater than 1, preferably an integer from 8 to 150,
in the presence of
(C) catalysts.

Examples of hydrocarbon radicals R are alkyl radicals such as the methyl, ethyl, n-propyl, isopropyl, 1-n-butyl-, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dociecyi radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and the 2-propenyl radical; aryl radicals such as the phenyl, naphthyl, anthryl and phenanthryl radical; alkaryl radicals such as o-, m-, p-tolyl radicals; xylyl radicals and ethylphenyl radicals; or aralkyl radicals such as the benzyl radical or the α- and the β-phenylethyl radical.

Examples of substituted hydrocarbon radicals R are halogenated hydrocarbon radicals such as the chloromethyl, 3-chloropropyl, 3-bromopropyl, 3,3,3-trifluoropropyl and 5,5,5,4,4,3,3-heptafluoropentyl radical, and also the chlorophenyl radical; hydroxyalkyl radicals such as the hydroxypropyl radical; or epoxide radicals such as the glycidyloxypropyl radical.

Radical R preferably signifies a monovalent hydrocarbon radical having 1 to 20 carbon atoms optionally substituted by halogen atoms or hydroxyl groups, particularly preferably a hydrocarbon radical having 1 to 6 carbon atoms, particularly an aliphatic hydrocarbon radical having 1 to 6 carbon atoms, particularly preferably the methyl, ethyl or propyl radical, especially the methyl radical.

Examples of radical $R^1$ are the radicals specified for radical R.

The radical $R^1$ is preferably SiC-bonded hydrocarbon radicals having 1 to 20 carbon atoms optionally substituted by halogen atoms or hydroxyl groups, particularly preferably a hydrocarbon radical having 1 to 6 carbon atoms, especially an aliphatic hydrocarbon radical having 1 to 6 carbon atoms, in particular the methyl, ethyl or propyl radical, especially preferably the methyl radical.

Examples of radical $R^2$ are the radicals specified for the radical R, and also polyalkylene glycol radicals bonded via carbon atoms.

The radical $R^2$ is preferably hydrocarbon radicals, particularly preferably hydrocarbon radicals having 1 to 6 carbon atoms, especially the methyl, ethyl or propyl radical.

Examples of radical $R^4$ are the radicals specified for the radical R.

The radical $R^4$ is preferably SiC-bonded hydrocarbon radicals having 1 to 20 carbon atoms optionally substituted by halogen atoms or hydroxyl groups, particularly preferably a hydrocarbon radical having 1 to 6 carbon atoms, especially an aliphatic hydrocarbon radical having 1 to 6 carbon atoms, in particular the methyl, ethyl or propyl radical, especially preferably the methyl radical.

Due to the production process, the radical $R^4$ may also have the meaning of Si-bonded halogen atoms, preferably chlorine atoms, or Si-bonded hydroxyl radicals. Siloxanes (B2), due to the production process, preferably comprise radicals $R^4$ equal to hydroxyl groups in amounts of at most 500 ppm by weight, based on the total weight of siloxane (B2).

Examples of radical Y are aliphatic saturated or unsaturated, straight-chain or branched radicals, which may be substituted by halogen atoms.

Radical Y is preferably an alkylene radical having 3 to 6 carbon atoms, which may optionally be substituted, especially by fluorine or chlorine. The radical Y is preferably a propylene or butylene radical, especially the propylene radical.

Examples of radical $R^x$ are the radicals specified for the radical R.

The radical $R^x$ is preferably a hydrogen atom or hydrocarbon radicals, optionally substituted by CN or halogen, preferably a hydrogen atom or alkyl groups, particularly preferably a hydrogen atom or linear alkyl groups having 1 to 6 carbon atoms, in particular a hydrogen atom, the methyl or ethyl radical, especially preferably a hydrogen atom.

Examples of siloxanes (A) used in accordance with the invention are
Et-O—CO—CO—NH—$C_3H_6$—$SiMe_2$-[$OsiMe_2$]$_{10}$-O—$SiMe_2$-$C_3H_6$—NH—CO—CO—O-Et,
Me-O—CO—CO—NH—$C_3H_6$—$SiMe_2$-[$OsiMe_2$]$_{10}$-O—$SiMe_2$-$C_3H_6$—NH—CO—CO—O-Et,
Me-O—CO—CO—NH—$C_3H_6$—$SiMe_2$-[$OSiMe_2$]$_{10}$-O—$SiMe_2$-$C_3H_6$—NH—CO—CO—O-Me,
Et-O—CO—CO—NH—$C_3H_6$—$SiMe_2$-[$OSiMe_2$]$_4$-O—$SiMe_2$-$C_3H_6$—NH—CO—CO—O-Et,
Me-O—CO—CO—NH—$C_3H_6$—$SiMe_2$-[$OSiMe_2$]$_4$-O—$SiMe_2$-$C_3H_6$—NH—CO—CO—O-Et,
Me-O—CO—CO—NH—$C_3H_6$—$SiMe_2$-[$OSiMe_2$]$_4$-O—$SiMe_2$-$C_3H_6$—NH—CO—CO—O-Me,
Et-O—CO—CO—NH—$C_3H_6$—$SiMe_2$-[$OSiMe_2$]$_2$-O—$SiMe_2$-$C_3H_6$—NH—CO—CO—O-Et,
Me-O—CO—CO—NH—$C_3H_6$—$SiMe_2$-[$OSiMe_2$]$_2$-O—$SiMe_2$-$C_3H_6$—NH—CO—CO—O-Et,
Me-O—CO—CO—NH—$C_3H_6$—$SiMe_2$-[$OSiMe_2$]$_2$-O—$SiMe_2$-$C_3H_6$—NH—CO—CO—O-Me,
Et-O—CO—CO—NH—$C_3H_6$—$SiMe_2$-O—$SiMe_2$-$C_3H_6$—NH—CO—CO—O-Et,
Me-O—CO—CO—NH—$C_3H_6$—$SiMe_2$-O—$SiMe_2$-$C_3H_6$—NH—CO—CO—O-Et and
Me-O—CO—CO—NH—$C_3H_6$—$SiMe_2$-O—$SiMe_2$-$C_3H_6$—NH—CO—CO—O-Me,
where Me denotes a methyl radical and Et denotes an ethyl radical.

Although not shown in formula (I), the siloxanes (A) used in accordance with the invention, due to the production process, may comprise a molar proportion of branches, i.e. T and/or Q units, that is to say if $R^1$ has the meaning of a siloxanyl radical, to an extent of preferably up to 1%, particularly preferably of up to 1000 ppm, especially does not comprise any branches.

The siloxanes (A) used in accordance with the invention are preferably those that are liquid at temperatures between 10 and 100° C. and a pressure of 1013 hPa, particularly preferably those that are liquid between 10 and 50° C. and at a pressure of 1013 hPa.

The siloxanes (A) used in accordance with the invention preferably have an APHA color number below 100, particularly preferably below 10.

The siloxanes (A) used in accordance with the invention can be prepared by methods common in silicon chemistry.

In this case, the siloxanes (A), due to the production process, may be present in the mixture with impurities such as with amino-oxo-acetate-functional silanols. The siloxanes (A) used in accordance with the invention preferably have a purity of 90% by weight, particularly preferably a purity >99% by weight, especially a purity >99.5% by weight.

In the context of the present invention, the APHA number is determined in accordance with DIN ISO 6271-2, preferably by means of a LICO 500 instrument from Hach-Lange. Here, the APHA value measured includes not only the color but additionally also the turbidity value of the measured product.

Examples of siloxanes (B1) used in accordance with the invention are
(HO)$Me_2$SiO[$SiMe_2$O]$_{45}$$SiMe_2$(OH),
(HO)MeViSiO[$SiMe_2$O]$_{30}$SiMeVi(OH) and
(HO)$Me_2$SiO[$SiMe_2$O]$_{15}$[SiMeVi]$_2$O$SiMe_2$(OH),
where Me denotes a methyl radical, Et an ethyl radical and Vi a vinyl radical.

The component (B1) used in accordance with the invention is preferably linear siloxanes having aliphatic substituents.

The component (B1) used, in accordance with the invention preferably has a viscosity of 5 to 10 000 mPas, particularly preferably 10 to 400 mPas, especially preferably 15 to 150 mPas, measured in each case at 25° C.

The viscosities are determined in this case in accordance with DIN 53019.

The siloxanes (B1) used in accordance with the invention, due to the production process, may comprise a molar proportion of branches, i.e. T and/or Q units, to an extent of preferably up to 1%, particularly preferably up to 1000 ppm, especially does not comprise any branches.

In addition, the siloxanes (B1), due to the production process, may still be present in the mixture with impurities such as water. The siloxanes (B1) used in accordance with the invention preferably have a purity of 80% by weight, particularly preferably a purity >90% by weight, especially a purity >99% by weight.

The organosilicon compounds (B1) are commercially available products or can be prepared by methods common in silicon chemistry.

Examples of siloxanes (B2) used in accordance with the invention are octamethylcyclotetrasiloxane, hexamethylcyclotrisiloxane, decamethylcyclopentasiloxane, dodecamethylcyclohexasiloxane and mixtures thereof.

The component (B2) used in accordance with the invention is preferably octamethylcyclotetrasiloxane, hexamethylcyclotrisiloxane and decamethylcyclopentasiloxane, particularly preferably octamethylcyclotetrasiloxane.

The siloxanes (B2) used in accordance with the invention, due to the production process, may comprise a molar proportion of branches, i.e. T and/or Q units, to an extent of preferably up to 1%, particularly preferably up to 1000 ppm, especially does not comprise any branches.

The organosilicon compounds (B2) are commercially available products or can be prepared by methods common in silicon chemistry.

In the process according to the invention, linear siloxanes (B1), cyclic compounds (B2) or mixtures thereof are used as component (B). Component (B) is preferably linear siloxanes (B1).

The ratio by mass between the siloxanes (B) and the component (A) in the process according to the invention can vary in wide ranges and is primarily determined by the desired molecular weight of the compounds which are intended to be produced by the process according to the invention.

In the process according to the invention, component (B) is preferably used in amounts from 10 to 200 parts by weight, particularly preferably 30 to 150 parts by weight, based in each case on 1 part by weight of component (A).

The catalysts (C) used can be the same catalysts which could be used in equilibrium methods described to date, such as strong acids or strong bases for example. The catalysts (C) used may be present in solid form or also in liquid form in the conditions of the process.

The catalysts (C) are preferably strong acids such as HCl, sulfuric acid, sulfonic acids or also phosphonitrile chloride (PNCl2) or oligomers thereof or polymeric analogues, or also strong bases such as NaOH, KOH, CsOH, RbOH, ammonium hydroxide or also phosphazene bases such as t-Bu-P4 base (Schwesinger base).

The catalysts (C) are preferably phosphorus-containing catalysts such as phosphazene bases or phosphonitrile chloride (PNCl2).

Catalysts (C) are used in amounts of preferably from 10 to 10 000 ppm by weight, particularly preferably 10 to 2000 ppm by weight, based in each case on the total amount of components (A) and (B).

Upon completion of the reaction according to the invention, the catalysts (C) optionally remain in the end product, in neutralized form or also in non-neutralized form, depending on the type, amount used or intended use of the end product or can be neutralized by known methods, for example by adsorption on basic oxides such as aluminum oxide, magnesium oxide or basic salts such as carbonates or hydrogencarbonates and optionally filtered off.

The process according to the invention can be carried out in the presence or in the absence of solvents (D). If solvents (D) are used, they are preferably aprotic solvents, particularly preferably aprotic solvents or solvent mixtures having a boiling range from 80 to 160° C. at 0.1 MPa. The solvent designation does not signify that all reaction components must be soluble therein. The presence of solvent (D) may serve the purpose, inter alia, of reducing the viscosity of the desired end product so that this may be conveyed or pumped more readily by technical means.

Preferred examples of aprotic solvents (D) optionally used are aliphatic hydrocarbons such as hexane, heptane or decane, aromatic hydrocarbons such as toluene or xylene, and ethers such as tetrahydrofuran (THF), diethyl ether and methyl tert-butyl ether (MTBE).

If solvents (D) are used in the process according to the invention, the amount should preferably be sufficient to ensure an adequate homogenization of the reaction mixture.

If solvents (D) are used in the process according to the invention, they are used in amounts of preferably 20 to 80% by weight, particularly preferably 20 to 50% by weight, based in each case on the total weight of all the components used. In the process according to the invention, preferably no solvents (D) are used.

In the process according to the invention, the proportion of the components (A) to (D) in the total amount of substances used is preferably at least 90% by weight, particularly preferably at least 95% by weight.

In the process according to the invention, apart from the components (A) to (D) and their impurities due to the production conditions, if present, preferably no further constituents are used.

In a preferred embodiment of the process according to the invention, (A) siloxanes of the formula (I), where $R^1$ is a methyl radical, $R^x$ is a hydrogen atom, m is 0 or an integer from 1 to 10, Y is —$C_3H_6$— and $R^2$ is an ethyl radical, are reacted with (B1) linear siloxanes of the formula (II), where R is a methyl radical and t is an integer from 25 to 40, in the presence of catalyst (C).

In a further preferred embodiment of the process according to the invention, (A) siloxanes of the formula (I), where $R^1$ is a methyl radical, $R^x$ is a hydrogen atom, m is Q or an integer from 1 to 10, Y is —$C_3H_6$— and $R^2$ is a methyl radical, are reacted with (B1) linear siloxanes of the formula (II), where R is a methyl radical and t is an integer from 25 to 40, in the presence of catalyst (C).

In a further preferred embodiment of the process according to the invention, (A) siloxanes of the formula (I), where $R^1$ is a methyl radical, $R^x$ is a hydrogen atom, m is 0 or an integer from 1 to 10, Y is —$C_3H_6$— and $R^2$ is an ethyl radical, are reacted with (B1) linear siloxanes of the formula (II), where R is a methyl radical and t is an integer from 100 to 150, in the presence of catalyst (C).

In a further preferred embodiment of the process according to the invention, (A) siloxanes of the formula (I), where $R^1$ is a methyl radical, $R^x$ is a hydrogen atom, m is 0 or an integer from 1 to 10, Y is —$C_3H_6$— and $R^2$ is an ethyl radical, are reacted with a mixture of (B1) linear siloxanes of the formula (II), where R is a methyl radical and t is an integer from 25 to 40, and (B2) cyclic siloxanes of the formula (III), where $R^4$ is a methyl radical and s is an integer from 4 to 6, in the presence of catalyst (C).

The components used in the process according to the invention may in each case be one type of a component of this kind as well as a mixture of at least two types of a particular component.

In the process according to the invention, the reactants used can be mixed with one another in any hitherto known manner. Although the sequence when mixing the constituents (A), (B), (C) and optionally (D) is not critical, it has proven to be best practice to add the catalyst (C) to the mixture of the other constituents preferably at the end. In this case, the catalyst (C) can also be added as a pre-mix in a solvent (D) or in one of the components (A) or (B), preferably in the component (B), particularly in order to facilitate the correct metered addition of the catalyst (C).

The process according to the invention is preferably carried out in this case under protective gas, such as nitrogen or argon for example, particularly preferably under nitrogen.

The selection of a suitable reactor for carrying out the process according to the invention is determined essentially by the viscosity of the reactants used and the viscosity of the expected product. In addition to classic stirred tanks, it is also possible in the case of high molecular weight products to use, inter alia, kneaders for carrying out the process.

The process according to the invention is preferably conducted at temperatures between 0 and 250° C., particularly preferably between 40 and 150° C., especially preferably between 50 and 120° C. The process according to the invention is preferably carried out at pressures between 1 hPa and 2000 hPa, but particularly preferably at pressures between 1 hPa and 1100 hPa, especially between 1 and 100 hPa.

After completion of the reaction, the product mixture thus obtained is processed in a manner known per se. The condensation products potentially formed in the process according to the invention, for example water or cyclic siloxanes, are removed preferably at elevated temperature and/or reduced pressure.

The amounts of cyclic siloxane products potentially remaining in the product mixture obtained according to the invention are preferably below 1% by weight, particularly preferably below 0.5% by weight, especially preferably below 0.1% by weight. In particular, the low molecular weight cyclic siloxanes of the general formula (III), where n=3 to 5, can be removed at temperatures and pressures known from the prior art by a downstream continuous or discontinuous vacuum distillation.

The process according to the invention may be carried out in batchwise mode, semi-continuously or fully continuously.

By the process according to the invention, functional siloxanes are obtained, which are used, for example, for coating fibres such as wool, cotton or textiles, or can be used for coating leather goods or as lubricants in machinery. In addition, the functional siloxanes produced in accordance with the invention can also be used in the production of polymers or in the modification of polymers.

The siloxanes produced in accordance with the invention have an APHA color number of 0 to 100, particularly preferably 0 to 20, especially preferably 0 to 10.

The siloxanes produced in accordance with the invention have an average molecular weight (number average) of 1000 g/mol to 100 000 g/mol, particularly preferably 2500 g/mol to 50 000 g/mol and especially preferably 10 000 to 45 000 g/mol.

The average molecular weight (number average) of the end product is mainly determined in this case by the respective ratio of the reactants used according to the invention.

The process according to the invention has the advantage that it is carried out simply and rapidly, in which simple starting products can be used.

The process according to the invention has the advantage that alkyloxalatoaminoalkyl-functional siloxanes (oxamide-functional siloxanes) are obtained in high purity, in particular without turbidity and without yellowing.

The process according to the invention has the further advantage that readily accessible, favorable and readily processable reactants can be used.

In the examples described below, all data in parts and percentages refer to weight unless stated otherwise. In addition, all viscosity data relate to a temperature of 25° C. a shear rate of 1 $s^{-1}$. Unless stated otherwise, the examples below are carried out at atmospheric pressure, i.e. about 1010 hPa, and at room temperature, i.e. at about 20° C., or at a temperature which adjusts to room temperature when combining the reactants without additional heating or cooling.

The following examples are carried out in the presence of nitrogen as protective gas.

The molecular weights specified in the examples are number-average molecular weights. The content of by-products and the average molecular weights are evaluated by NMR spectroscopy. In this case, the average chain length, the residual Si—OH contents, cycle contents and the contents of dimeric by-products are determined by 29Si-NMR spectroscopy.

The viscosities were measured by means of a cone-plate viscometer from Anton-Paar.

Me denotes a methyl radical.

The following reactants are used:

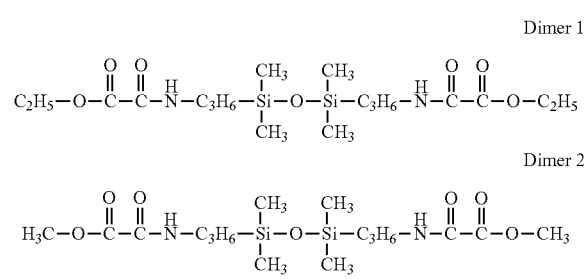

Siloxane 1:
Bishydroxy-terminated polydimethylsiloxane HO[SiMe$_2$O]$_{32.3}$H having an average molecular weight of 2408 g/mol and a water content of 370 ppm.

Siloxane 2:
Bishydroxy-terminated polydimethylsiloxane HO[SiMe$_2$O]$_{10.6}$H having an average molecular weight of 802 g/mol and a water content of 430 ppm.

Siloxane 3:
Bishydroxy-terminated polydimethylsiloxane HO[SiMe$_2$O]$_{144.3}$H having an average molecular weight of 10 696 g/mol and a water content of 220 ppm.

Siloxane 4:
Octamethylcyclotetrasiloxane (SiMe$_2$O$_4$, distilled, water content <40 ppm.

Catalyst 1:

(PNCl2)n, 100%, linear poly-phosphonitrile chloride, CAS No: 1832-07-1, obtainable from Silar, Wilmington N.C., USA under the product number 1996.

Catalyst 2:

1-tert-Butyl-4,4,4-tris(dimethylamino)-2,2-bis[tris(dimethylamino)phosphoranylidenamino]-2$\lambda^5$,4$\lambda^5$-catenadi (phosphazene) P4-t-Bu solution in hexane (0.8 M) (commercially available under the name phosphazene base P4-t-Bu solution from Sigma-Aidrich, Munich, Germany).

Example 1

500 g of siloxane 1 were mixed at room temperature with 15.0 g of dimer 1 and 52 mg of catalyst 1. Subsequently, the mixture was heated to 90° C. at a pressure of 4 mbar for 3 h whereupon the reaction mixture was clear and transparent after about 1.5 h. After 3 h, the mixture was heated at 100° C. for a further 30 minutes, then cooled to 22° C. and aerated. 1.0 g of magnesium oxide was then added, the mixture was stirred for 20 minutes and the magnesium oxide filtered off again. This gave a colorless, clear, transparent bisethyloxalatoaminopropyl-functional silicone oil having an APHA number of 3, a viscosity of 845 mPas, an average molecular weight of 15 272 g/mol and a residual Si—OH content of 75 ppm.

Example 2

500 g of siloxane 1 were mixed at room temperature with 15.0 g of dimer 1 and 52 mg of catalyst 1. Subsequently, the mixture was heated to 90° C. at a pressure of 4 mbar for 3 h whereupon the reaction mixture was clear and transparent after about 1.5 h. After 3 h, the mixture was heated at 100° C. for a further 30 minutes, then cooled to 22° C. and aerated. 1.0 g of magnesium oxide was then added, the mixture was stirred for 20 minutes and the magnesium oxide filtered off again. This gave a colorless, clear, transparent bisethyloxalatoaminopropyl-functional silicone oil having an APHA number of 2, a viscosity of 830 mPas, an average molecular weight of 15 100 g/mol and a residual Si—OH content of 105 ppm.

Example 3

500 g of siloxane 3 were mixed at room temperature with 5.0 g of dimer 1 and 60 mg of catalyst 1. Subsequently, the mixture was heated to 90° C. at a pressure of 4 mbar for 3 h whereupon the reaction mixture was clear and transparent after about 1.5 h. After 3 h, the mixture was heated at 100° C. for a further 30 minutes, then cooled to 22° C. and aerated. This gave a colorless, clear, transparent bisethyloxalatoaminopropyl-functional silicone oil having an APHA number of 2, a viscosity of 13 Pas, an average molecular weight of 45 100 g/mol and a residual Si—OH content of 60 ppm.

Example 4

250 g of siloxane 1 and 250 g of siloxane 4 were mixed at room temperature with 15.0 g of dimer 1 and 60 mg of catalyst 1. Subsequently, the mixture was heated to 90° C. for 6 h whereupon the reaction mixture was clear and transparent after about 4 h. After 6 h, the mixture was heated at 130° C. at a pressure of 4 rubar for a further 180 minutes, then cooled to 22° C. and aerated. 1.0 g of magnesium oxide was then added, the mixture was stirred for 20 minutes and the magnesium oxide filtered off again. This gave a colorless, clear, transparent bisethyloxalatoaminopropyl-functional silicone oil having an APHA number of 4, a viscosity of 780 mPas, an average molecular weight of 14 760 g/mol and a residual Si—OH content of 45 ppm. The content of remaining siloxane cycles was below 1000 ppm.

Example 5

500 g of siloxane 1 were mixed at room temperature with 15.0 g of dimer 2 and 52 mg of catalyst 1. Subsequently, the mixture was heated to 90° C. at a pressure of 4 mbar for 3 h whereupon the reaction mixture was clear and transparent after about 1.5 h. After 3 h, the mixture was heated at 100° C. for a further 30 minutes, then cooled to 22° C. and aerated, 1.0 g of magnesium oxide was then added, the mixture was stirred for 20 minutes and the magnesium oxide filtered off again. This gave a colorless, clear, transparent bismethyloxalatoaminopropyl-functional silicone oil having an APHA number of 3, a viscosity of 720 mPas, an average molecular weight of 14 310 g/mol and a residual Si—OH content of 65 ppm.

Example 6

500 g of siloxane 1 were mixed at room temperature with 15.0 g of dimer 1 and 200 μl of catalyst 2. Subsequently, the mixture was heated at 90° C. at a pressure of 4 mbar for 5 h whereupon the reaction mixture was clear and transparent after about 2.0 h. After 3 h, the mixture was heated to 100° C. for a further 30 minutes, then cooled to 22° C. and aerated. This gave a colorless, clear, transparent bisethyloxalatoaminopropyl-functional silicone oil having an APHA number of 2, a viscosity of 860 mPas, an average molecular weight of 15 440 g/mol and a residual Si—OH content of 90 ppm.

Example 7

500 g of siloxane 3 were mixed at room temperature with 10.0 g of dimer 1 and 150 mg of catalyst 1. Subsequently, the mixture was heated to 130° C. at a pressure of 2 mbar for 6 h whereupon the reaction mixture was clear after about 1.5 h. Subsequently, the mixture was cooled to 22° C. under reduced pressure of 2 hPa and aerated. This gave a colorless, transparent bisoxamide-functional silicone oil having an APHA number of 6, a viscosity of 19 Pas, an average molecular weight of 71 400 g/mol and a residual Si—OH content of 70 ppm.

The invention claimed is:

1. A process for producing amino-oxo-acetate-functional organosiloxanes by reacting (A) siloxanes of the general formula (I)

$$R^2-O-\overset{O}{\underset{}{\overset{\|}{C}}}-\overset{O}{\underset{}{\overset{\|}{C}}}-\overset{R^x}{\underset{}{N}}-Y-\overset{R^1}{\underset{R^1}{Si}}-\left[O-\overset{R^1}{\underset{R^1}{Si}}\right]_m-O-\overset{R^1}{\underset{R^1}{Si}}-Y-\overset{R^x}{\underset{}{N}}-\overset{O}{\underset{}{\overset{\|}{C}}}-\overset{O}{\underset{}{\overset{\|}{C}}}-O-R^2$$

with (B) siloxanes selected from (B1) linear siloxanes of the general formula

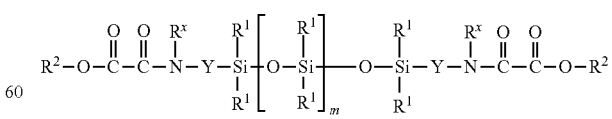

$$HO[SiR_2O]_xH \qquad (II)$$

and (B2) cyclic compounds of the general formula $$(SiR^4{}_2O)_s \quad (III),$$

where

R may be the same or different and denotes a hydrogen atom or monovalent, optionally substituted, SiC-bonded hydrocarbon radicals, which may be interrupted by heteroatoms, $R^1$ may be the same or different and denotes monovalent, optionally substituted, SiC-bonded hydrocarbon radicals, which may be interrupted by heteroatoms, Y may be the same or different and represents divalent, optionally substituted hydrocarbon radicals, which may be interrupted by oxygen atoms, $R^2$ may be the same or different and denotes a hydrogen atom, monovalent, optionally substituted hydrocarbon radicals, which may be interrupted by oxygen atoms, $R^4$ may be the same or different and denotes a hydrogen atom, Si-bonded halogen atom, Si-bonded hydroxyl group or monovalent, optionally substituted, SiC-bonded hydrocarbon radicals, which may be interrupted by heteroatoms, $R^x$ may be the same or different and signifies a hydrogen atom or an optionally substituted hydrocarbon radical, m is 0 or an integer, s is an integer from 3 to 10 and t signifies an integer greater than 1, in the presence of (C) catalysts.

2. The process as claimed in claim 1, wherein component (B) is linear siloxanes (B1).

3. The process as claimed in claim 1, wherein component (B) is used in amounts from 10 to 200 parts by weight, based on 1 part by weight of component (A).

4. The process of claim 1, wherein catalysts (C) are phosphorus-containing catalysts.

5. The process of claim 1, wherein catalysts (C) are used in amounts from 10 to 10 000 ppm by weight, based on the total amount of components (A) and (B).

6. The process of claim 1, wherein said process is carried out under protective gas.

7. The process of claim 1, wherein said process is carried out at temperatures between 0 and 250° C.

8. The process of claim 1, wherein said process is carried out at pressures between 1 hPa and 2000 hPa.

9. The process of claim 1, wherein the siloxanes produced have an average molecular weight (number average) of 1000 g/mol to 100 000 g/mol.

\* \* \* \* \*